Oct. 11, 1960  L. CLARKE  2,955,909
PROCESS FOR PURIFYING GASES AND SYNTHESIS OF AMMONIA THEREFROM
Filed June 5, 1957
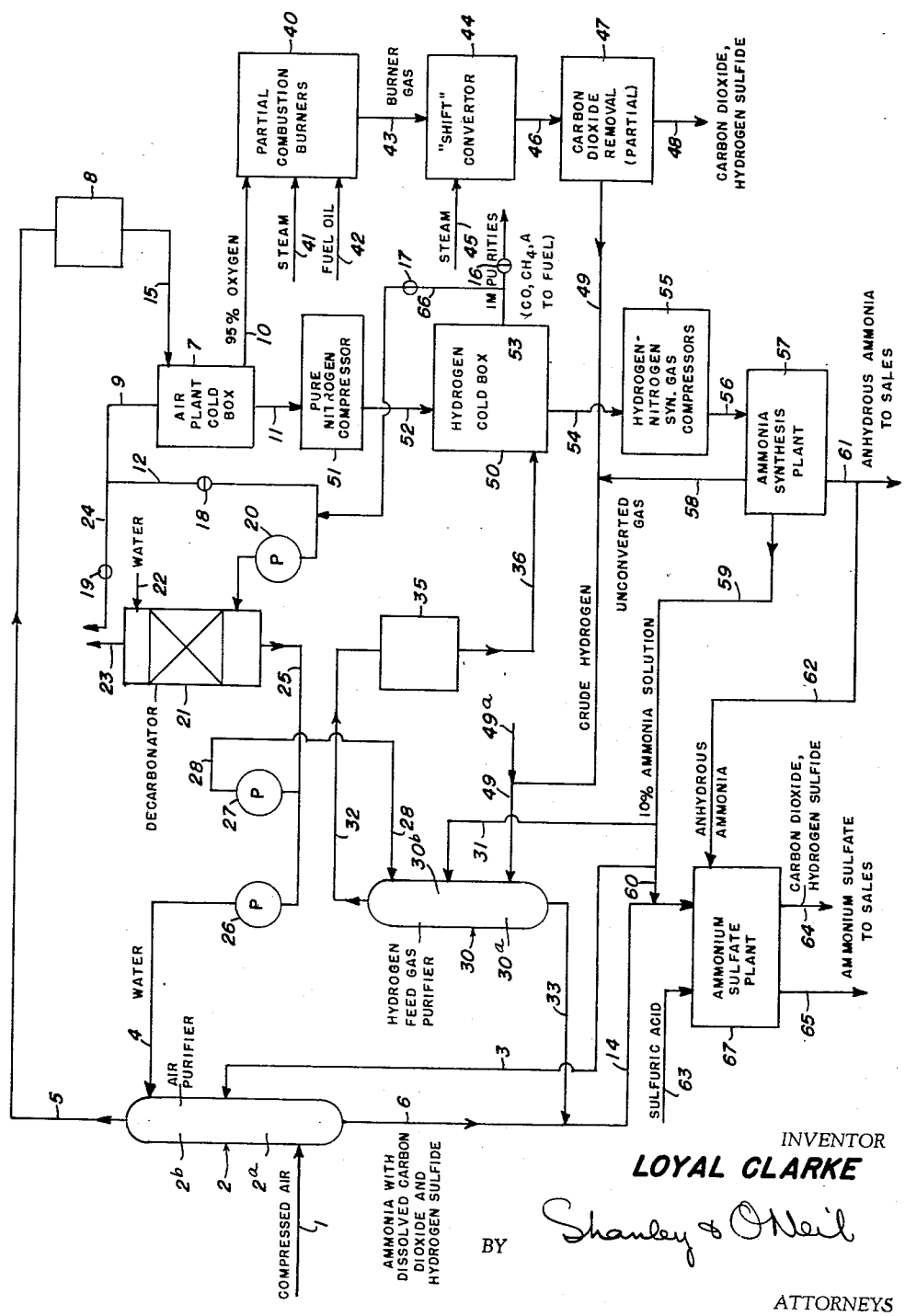
INVENTOR
LOYAL CLARKE
BY Shanley & O'Neil
ATTORNEYS

2,955,909

PROCESS FOR PURIFYING GASES AND SYNTHESIS OF AMMONIA THEREFROM

Loyal Clarke, South Whitehall Township, Lehigh County, Pa., assignor to Air Products Incorporated, a corporation of Michigan Filed June 5, 1957, Ser. No. 663,736

5 Claims. (Cl. 23—2)

The present invention relates to a novel apparatus and process for the purification of gases or gaseous mixtures and more particularly to the removal of acidic impurities therefrom. In its more specific aspects, the present invention relates to a novel apparatus and process for producing gases or gaseous mixtures useful in the synthesis of ammonia that are substantially free of acidic impurities, and to the synthesis of ammonia therefrom.

Gases or gaseous mixtures used commercially for various purposes often contain carbon dioxide, hydrogen sulfide, sulfur dioxide, hydrogen cyanide or other acidic impurities which may interfere with chemical reactions in which the gases are ultimately involved or result in impure reaction products or injure the processing equipment. In instances where acidic impurities have a detrimental effect and are thus undesirable, it is necessary to provide a suitable means and method for their complete removal or at least for reducing their concentration to such a level as to reduce or eliminate their detrimental effects.

Some industrial processes are not adversely affected by acidic impurities until the concentration reaches a substantial level, while other industrial processes require the substantially complete removal of acidic substances when operating under preferred conditions. The present invention is primarily concerned with those industrial systems and processes requiring the substantially complete removal of acidic impurities from gases or gaseous mixtures, and to a process for the substantially complete removal of acidic impurities from gases or gaseous mixtures. However, the invention may be modified to provide an apparatus and process which do not necessarily effect substantially complete removal of acidic impurities.

While aqueous ammonia has been used for the purpose of reducing acidic impurities in gases or gaseous mixtures, it has not been possible heretofore to effect the substantially complete removal of acidic impurities using only aqueous ammonia as the absorbent. The minimum concentration of acidic impurity achieved by ammonia scrubbing in accordance with prior art teachings and without further treatment was well above the maximum concentration permissible for low temperature rectifications and in such operations a secondary absorption means was necessarily employed to effect final removal of the remaining acidic impurity. In practice, the final removal of low concentrations of acidic impurity was usually effected by caustic scrubbing.

The present invention will be described herein with particular reference to the provision of a stream of gaseous hydrogen or nitrogen, or gaseous mixtures containing hydrogen and/or nitrogen, that are substantially free of acidic impurities, and to the synthesis of ammonia therefrom. However, it will be appreciated by those skilled in the art that the present invention is also useful for removing acidic impurities from other gases or gaseous mixtures, and in other industrial processes.

It is an object of the present invention to provide an improved apparatus and a novel process for the substantially complete removal of acidic impurities from gases or gaseous mixtures containing the same utilizing aqueous ammonia solution without loss of ammonia vapors in the gases or gaseous mixtures.

It is still a further object of the present invention to provide an improved apparatus and a novel process for effecting the substantially complete removal of acidic impurities from gases or gaseous mixtures containing the same by absorption with a fresh ammonia solution followed by a wash with acidic impurity free water.

It is still a further object of the present invention to provide an improved apparatus and a novel process for the removal of acidic impurities from gases or gaseous mixtures containing the same by absorption with a fresh ammonia solution, wherein the spent ammonia solution is recovered and used in the manufacture of ammonium salts.

It is still a further object of the invention to provide a novel process and improved apparatus for the substantially complete removal of acidic impurities from gases or gaseous mixtures containing the same by absorption with a fresh ammonia solution, wherein entrained ammonia may be reabsorbed without recontamination of the gases or gaseous mixtures with acidic impurities.

It is still a further object of the present invention to provide an improved apparatus and a novel process for the substantially complete removal of acidic impurities from gaseous hydrogen, or nitrogen, or gaseous mixtures containing hydrogen and/or nitrogen, and for the synthesis of ammonia from gaseous mixtures of hydrogen and nitrogen thus prepared.

It is still a further object of the present invention to provide an improved apparatus and a novel process for providing wash water for use in the present invention wherein the wash water is stripped with a gas substantially free of acidic impurities.

It is still a further object of the present invention to provide an improved apparatus and a novel process for providing wash water for use in the present invention wherein the wash water is stripped with a dry gas substantially free of acidic impurities in quantities many times greater than theoretically required to substantially remove the acidic impurity content of the water and sufficient to reduce materially the temperature of the wash water.

Still other objects of the present invention and the attendant advantages thereof will be apparent to those skilled in the art by reference to the following detailed description and the drawings, which diagrammatically illustrate one arrangement of apparatus in accordance with the invention and suitable for carrying out the process of the invention.

As stated above, it has been proposed in the prior art to treat gases containing acidic impurities by contacting them with an aqueous ammonia solution. The ammonia being volatile is carried out of the solution in the purified gas and it has heretofore been proposed to scrub this effluent gas with water to recover the ammonia carryout. It is well known that the water from most sources available in quantities sufficient for commercial operations includes acidic impurities, for example carbon dioxide. For this reason, the use of ammonia as a gas purifier has been limited in the prior art to those environments where slight residual acidic impurities in the cleaned-up gas are not objectionable. Where substantially complete freedom from acidic impurities in the treated gas is a requirement, alkali scrubbing has been resorted to.

In accordance with one important feature of the present invention, a process and apparatus is provided by which gases and mixtures of gases having minor proportions of acidic impurities can be substantially completely freed of these acidic impurities by contact with aqueous ammonia solution. This is made possible by treatment of the gaseous effluent of the aqueous ammonia solution contact step with specially treated water.

In the prior art use of aqueous ammonia solution for the removal of acidic impurities from gases and gaseous mixtures, an economic drawback has been the large amount of ammonia vapors carried out by the effluent gases and the loss of these ammonia vapors due to their low concentration in the wash water from the recovery portion of the apparatus and method. In the present invention by special treatment of the wash water prior to contact with the effluent gases, the amount of water necessary is reduced and it is economic to recover ammonia from this water.

In ammonia synthesis plants, gases and mixtures of gases being processed must be free from acidic impurities. The present invention provides an apparatus and method especially useful as component parts of synthesis gas systems wherein ammonia for the gas or gas mixture purifying step is supplied by the plant and the fouled aqueous ammonia solution is utilized in the manufacture of ammonium sulfate in the plant.

In ammonia synthesis plants, air is fractionated to supply nitrogen for the synthesis of the ammonia and hydrogen containing hydrocarbon gases are treated to separate hydrogen for the synthesis process. The apparatus and method of the present invention utilize one or more by-product gases from the treatment of these feedstock gases to condition wash water which is utilized in the effluent gas washing apparatus and method for recovering ammonia vapor carry-out in the purified gases or gas mixtures.

In this specification and appended claims, the purified gas or gaseous mixture is described as being substantially free of acidic impurities and the washed effluent gas is described as being substantially free of ammonia. The terminology "substantially free" is used to describe a condition in which the maximum residual concentration of acidic impurities or ammonia in the gas or gaseous mixtures treated are well below those permissible for treatment of gaseous feedstocks at extremely low temperatures below the freezing points of these substances and thus a secondary means for more complete removal need not be employed.

The drawing diagrammatically illustrates a presently preferred arrangement of apparatus in accordance with the invention when specifically applied to the synthesis of ammonia. Inasmuch as carbon dioxide and hydrogen sulfide are the most common acidic impurities which must be removed in the particular process illustrated in the drawing, the discussion hereinafter may be limited to the removal of carbon dioxide and hydrogen sulfide. However, it is understood that other acidic impurities may be removed.

Referring now to the drawing, a stream of clean compressed air free of dust and hydrocarbons is delivered through line 1 to the base of absorption column 2. The compressed air flows upwardly through suitable plates, baffles, trays or packing in absorption column 2 and counter-currently to a downwardly flowing dilute fresh aqueous ammonia solution that is introduced into the intermediate portion of absorption column 2 through line 3 at a point substantially above compressed air line 1. The zone in absorption column 2 between the point of introduction of compressed air through line 1 and the point of introduction of aqueous ammonia solution through line 3 comprises a lower absorption zone 2a in which carbon dioxide, hydrogen sulfide or other acidic impurities are removed from the incoming compressed air stream. Upon leaving the upper portion of the lower absorption zone 2a, the compressed air is essentially free of acidic impurities but contains gaseous ammonia evaporated from the aqueous ammonia solution when in contact with this solution in the lower absorption zone. Inasmuch as gaseous ammonia in the air feed to an air separation plant is also undesirable, it must be removed prior to further processing in the air plant. This is accomplished by absorbing the ammonia in specially treated water supplied to the upper portion of absorption column 2 through line 4, which water is caused to flow countercurrently to the air in this absorption zone. The zone in column 2 above the point of introduction of aqueous ammonia solution through line 3 comprises an upper absorption zone 2b in which the gaseous ammonia content of the stream of compressed air is absorbed by the wash water to thereby form a dilute aqueous ammonia solution. The dilute ammonia solution thus formed may in some plants have the function of substantially eliminating by absorption in the upper absorption zone 2b slight residual acidic impurity content remaining in the compressed air leaving the lower absorption zone 2a but normally, as stated above, zone 2a is designed to substantially eliminate the acidic impurities. The high degree of gas purification of the present invention is made possible only by the fact that the stream of water entering through line 4 is water which has been substantially freed of acidic impurities of a nature that would recontaminate the air stream with acidic impurities. The stream of compressed air, now substantially free of both acidic impurities and gaseous ammonia, is removed from the top of the absorption column 2 through line 5, while spent aqueous ammonia solution is withdrawn via line 6 and sent to ammonium sulfate plant 67 via line 14. The wash water fed to zone 2b of the absorption column through line 4 may be withdrawn separately from the lower portion of the zone 2b or may be mixed with the aqueous ammonia solution introduced through line 3 and withdrawn via line 6, as shown in the drawing.

The stream of compressed air in line 5, now substantially free of acidic impurities and gaseous ammonia, is dried before passing to air plant cold box 7. Preferably, this is accomplished by providing cooling and drying means 8 in line 5 for cooling the air stream to a temperature low enough to effect condensation of water and then drying the stream of air in any suitable manner. The dried gas is withdrawn from 8 and passed via line 15 to air plant cold box 7.

The air plant cold box 7 is illustrated in the drawings as comprising a single unit for the purpose of simplifying the drawings. However, it will be understood by those skilled in the art that air plant cold box 7 contains conventional equipment for the separation of air, in the illustrated embodiment, into at least three streams, i.e., impure gaseous nitrogen which is withdrawn via line 9, a gaseous oxygen stream which is withdrawn via line 10, and a pure gaseous nitrogen stream which is withdrawn via line 11. Each of these three products may be used in the process of the present invention, as will be more fully described hereinafter.

In the illustrated plant, the stream of oxygen withdrawn from air plant cold box 7 via line 10 contains approximately 95% oxygen and may be utilized for the purpose of producing burner gas. The oxygen, steam and fuel oil are fed in proper proportions to burners in partial combustion zone 40 via lines 10, 41 and 42, respectively, to produce burner gas that is withdrawn via line 43 and passed to shift converter 44. The proper amount of steam to produce a hydrogen rich feed gas is also fed to shift converter 44 via line 45. The resulting hydrogen rich feed gas is withdrawn from shift converter 44 via line 46 and passed to carbon dioxide removal unit 47 where acidic impurities are partially removed by conventional means and bled to the atmosphere via line 48. A stream of crude hydrogen containing considerable quantities of impurities such as carbon monoxide, methane and argon, and relatively smaller amounts of acidic impurities such as carbon dioxide and hydrogen sulfide, is withdrawn from unit 47 via line 49 and fed to the base of absorption column 30.

The basic construction and method of operation of absorption column 30 is similar to that of absorption column 2. The crude hydrogen stream is introduced via line 49, or from an extraneous source through line 49a, or from both, into the base of absorption column 30 and flows upwardly and countercurrently to a downwardly flowing dilute fresh aqueous ammonia solution which is introduced into the intermediate portion of absorption column 30 via line 31 at a point substantially above crude hydrogen line 49. The zone in absorption column 30 between the points of entry of lines 49 and 31 comprises a lower absorption zone 30a wherein acidic impurities such as carbon dioxide and hydrogen sulfide are substantially completely removed from the stream of crude hydrogen. A crude hydrogen effluent essentially free of acidic impurities but containing gaseous ammonia resulting from contact with the dilute aqueous ammonia solution while in the lower absorption zone is withdrawn from the upper portion of the lower absorption zone and passed into the upper absorption zone 30b, which comprises that portion of absorption column 30 above the point of entry of line 31 and the point of entry of wash water line 28. Water substantially free of carbonate, carbon dioxide, hydrogen sulfide and similar acidic impurities is introduced into absorption column 30 via line 28 for the purpose of countercurrently contacting the upwardly flowing crude hydrogen and absorbing the ammonia content thereof. The dilute aqueous ammonia solution thus formed may further reduce the acidic impurity content of the crude hydrogen but normally, as stated above, zone 30a is designed to substantially eliminate the acidic impurities. The crude hydrogen now substantially free of both acidic impurities and gaseous ammonia is withdrawn from the upper portion of the upper absorption zone 30b via line 32, while the spent dilute aqueous ammonia solution is withdrawn from the base of absorption column 30 via line 33 and sent to join the spent ammonia solution in line 6 being passed to ammonium sulfate plant 67 via line 14. The wash water introduced via line 28 may be withdrawn separately from the lower portion of the upper absorption zone 30b by means not shown, or mixed with the spent dilute aqueous ammonia solution and withdrawn via line 33, as shown in the drawing.

The stream of crude hydrogen in line 32, now substantially free of acidic impurities and gaseous ammonia, is dried before passing to hydrogen cold box 50. Preferably, this is accomplished by providing cooling means (not shown) in line 32 for cooling the crude hydrogen to a temperature low enough to effect condensation of water, and then passing the partially dried crude hydrogen stream through drier 35. The dried gas is withdrawn therefrom and passed via line 36 to hydrogen cold box 50.

The stream of pure gaseous nitrogen withdrawn via line 11 from air plant cold box 7 is passed to nitrogen compressor 51 and then via line 52 to hydrogen cold box 50. The hydrogen cold box 50 has been shown as comprising a single unit for the purpose of simplifying the drawing. However, those skilled in the art will recognize that hydrogen cold box 50 contains suitable conventional means for removing non-acidic impurities from the incoming crude hydrogen stream and means for producing an ammonia synthesis gas from the purified hydrogen stream thus produced and at least a portion of the pure nitrogen feed.

A portion of the stream of pure nitrogen entering cold box 50 via line 52 may be used in hydrogen cold box 50 for scrubbing non-acidic impurities such as carbon monoxide, methane and oxygen from the crude hydrogen stream to thereby produce a purified hydrogen stream. The non-acidic impurities removed from hydrogen cold box 50 via line 53 contain considerable amounts of combustible gases, such as methane and/or carbon monoxide, and will be referred to by the term "fuel gas" hereinafter. A second portion of the pure nitrogen stream is used in making up ammonia synthesis gas from the purified hydrogen stream obtained from the foregoing purification step and the ammonia synthesis gas thus produced is then passed via line 54 to hydrogen-nitrogen synthesis gas compressor 55.

In order to condition the water going to columns 2 and 30, it is treated in a special zone 21, herein termed the decarbonator, where it is rendered substantially free of acidic impurities and its temperature is reduced to a level at which a minimum amount of water, practical under the conditions present, will be needed in the upper zones 2b and 30b of columns 2 and 30. This is accomplished as follows: Fuel gas issuing from hydrogen cold box 50 through line 53 is directed through valve 17 and line 66 to pump 20 and through line 12 into the base of decarbonator 21. Decarbonator 21 is any suitable liquid-gas contact apparatus, the water to be conditioned entering the top through line 22 and descending in countercurrent contact with rising fuel gas from line 12. The conditioned water leaves the lower portion of decarbonator 21 through line 25 and fuel gas which has been contacted with the water goes to a point of utilization through line 23 at the top of the decarbonator. Where desired, the fuel gas fed to the decarbonator may be supplemented with impure nitrogen by cracking valve 18 and throttling valve 19. Since the impure nitrogen product includes oxygen, there would be a tendency toward corrosion in the decarbonator unless precautions are taken in the materials of construction. Where there is no fuel gas or insufficient fuel gas for the purposes of this invention, the entire gas stream utilized in the decarbonator may be impure nitrogen. In such case, valve 17 would be closed and valve 16 open to direct any fuel gas to a point of utilization.

The action of the fuel gas or the waste nitrogen gas, or both, on the water in the decarbonator is twofold. The principal acidic impurity present in natural waters is carbon dioxide. The minute quantities of this gas dissolved in the water is stripped out by the fuel gas, nitrogen or both. Additionally, the stripping gases being completely dry exert a cooling effect on the water being conditioned. As a result of these two phenomena, conditioned water for use in columns 2 and 30 is provided substantially free of acidic impurities and at a relatively low temperature. Of course, other gaseous dissolved acidic impurities would also be removed.

The relatively low temperature of the conditioned water in line 25 makes possible recovery of ammonia gas carried into the upper portions 2b and 30b of the columns with a minimum quantity of water utilized. This in turn maintains the dilution of the fouled ammonia solution at a minimum and makes economic recovery of the ammonia in this solution.

The conditioning of the water in decarbonator 21 to remove substantially all acidic impurities makes possible a gas treating process and system which will produce a purified gas substantially free of acidic impurities and this feature, taken with the above described minimal usage of water makes the present invention applicable to many industrial environments where highly purified gases are required.

The compressed synthesis gas is withdrawn via line 56 and passed to ammonia synthesis plant 57 where a portion thereof is converted to ammonia. Unconverted synthesis gas from the ammonia synthesis plant 57 is withdrawn via line 58 and combined with the crude hydrogen stream in line 49 for recycling in the process. A portion of the ammonia thus produced is withdrawn from ammonia synthesis plant 57 via line 59 as a dilute aqueous ammonia solution such as 10% by weight for the purpose of supplying dilute aqueous ammonia solution to absorption column 30 via line 31, or to absorption column 2 via line 3, or to ammonium sulfate plant 67 via line 60. Thus, ammonia synthesis plant 57 is a convenient source for the fresh dilute aqueous ammonia solution free of acidic impurities and salts thereof that is necessary for use in absorption columns 2 and 30. The major proportion of the ammonia produced in ammonia synthesis plant 57 is normally withdrawn via line 61 as anhydrous ammonia and sold as such, or all or a portion thereof may be supplied via line 62 to ammonium sulfate plant 67.

The various sources of ammonia supplied to ammonium sulfate plant 67 are neutralized with sulfuric acid, or other suitable mineral acid introduced via line 63. The gaseous acidic substances formed upon neutralization of the spent ammonia solution from absorption columns 2 and 30, such as carbon dioxide or hydrogen sulfide, may be bled off to the atmosphere via line 64 and the ammonium mineral acid salt, such as the sulfate, recovered as a product, as indicated by line 65.

As mentioned above, an important feature of the present invention resides in the novel method and apparatus disclosed herein for providing a treated wash water for feeding to columns 2 and 30. As pointed out, this may be accomplished by stripping a soft water containing acidic impurities in decarbonator 21 with a gas substantially free of acidic impurities and in quantities sufficient to provide wash water substantially free of acidic impurities upon exit from decarbonator 21. It is not necessary that the particular gaseous stripping agent employed for this purpose be the dried product nitrogen or fuel gas above mentioned, as other suitable gaseous stripping agents may be used. However, it is essential that the wash water fed to absorption columns 2 and 30 be substantially free of acidic impurities and the particular gaseous stripping agent employed must be selected and used in quantities sufficient to effect this end. Otherwise, the treated gases exiting from the tops of the upper absorption zones of columns 2 and 30 will be contaminated with sufficient amounts of acidic impurities to render the same useless for the purpose of the present invention.

The wash water entering absorption columns 2 and 30 should be at a temperature not greater than about 90° F. if complete absorption of ammonia vapors in the gaseous effluent is to be effected with a practical volume of wash water. This presents a problem where the source of the water, as in the tropics and subtropics, is at a high temperature level. Satisfactory results are obtained when the wash water is at a temperature of 60–90° F., with even better results being obtained, i.e, less wash water, at temperatures below 60° F. Thus, still another important feature of the present invention resides in a novel method and apparatus for providing a wash water both substantially free of acidic impurities and cooled to a temperature not greater than about 90° F., or to a suitable temperature low enough to effect complete absorption of the ammonia vapors when employing a practical volume of wash water. This is accomplished by using a dry gaseous stripping agent in decarbonator 21 in quantities many times greater than theoretically needed to remove the acidic impurity content of the water and sufficient to materially reduce the temperature of the water. The excess gaseous stripping agent cools the inlet water to the decarbonator 21 by evaporating a portion thereof, and this cooling effect normally is great enough to maintain the temperature of the treated water no higher than 60° F. provided a sufficient amount of gaseous stripping agent is used. The process and apparatus for the synthesis of ammonia described herein is unique in providing dry stripping gases, i.e., dry fuel gases and/or nitrogen, which are readily available in excess of the quantities needed for removal of the acidic impurities in decarbonator 21 and thus the practice of using large excesses of the gaseous stripping agent is economical.

It will be appreciated that the relative flow rates of inlet soft water and gaseous stripping agent to decarbonator 21 can vary widely depending upon a number of factors. In most instances, the gaseous stripping agent is used in quantities in excess of those theoretically required to effect substantially complete removal of the acidic impurity content of the water. Where the initial temperature of the inlet water is sufficiently elevated to require cooling, then the gaseous stripping agent must be used in quantities many times greater than the theoretical quantity required for complete removal of acidic impurities and sufficient to reduce materially the initial temperature of the inlet water, e.g., to a temperature not greater than 90° F. and, preferably, to a temperature not greater than 60° F.

As indicated above, the relative rates of inlet flow of soft water and gaseous stripping agent to decarbonator 21 may vary over wide ranges. For example, assuming that the amount of gaseous stripping agent fed to decarbonator 21 is adequate to reduce the temperature of the inlet water from 90° F. to 60° F., then this same amount of gaseous stripping agent is generally about 20 to 50 times that theoretically required for removal of the acidic impurities such as carbon dioxide, hydrogen sulfide, etc. One example illustrating adjustment of the feed rates of soft water and gaseous stripping agent to decarbonator 21 may be described as follows: A soft water (hardness less than 10 p.p.m. calculated as $CaCO_3$) and containing small undetermined amounts of carbon dioxide, hydrogen sulfide, etc., is fed to decarbonator 21 via line 22 at the rate of about 11,400 lb./hr., and dry fuel gases having a temperature of about 35° F. removed from hydrogen cold box 50 via line 53 are fed to line 12 via line 66 into the lower portion of decarbonator 21 at the rate of about 9200 lb./hr. The fuel gases, after passing upward through decarbonator 21, are removed via line 23, together with about 400 lb./hr. of evaporated water and the acidic impurity content of the water. The treated wash water withdrawn from the bottom of decarbonator 21 via line 25 will have a temperature of about 60° F. and will be substantially free of acidic impurities.

It will be appreciated by those skilled in the art that the relative flow rates of inlet gas, dilute aqueous ammonia solution and wash water to absorption columns 2 and 30 will vary depending upon a number of factors such as the acidic impurity content of the inlet gas, the degree of purification desired, the temperature employed, etc. The acidic impurity content of the inlet gas may vary over wide ranges, but the economic advantage of the present invention appears to taper off above a concentration of about four mol percent acidic impurity. In general, the aqueous ammonia solution supplied to the absorption column should have an ammonia content in excess of the theoretical minimum necessary to absorb the acidic impurity content of the inlet gas at its temperature. Satisfactory molar ratios of ammonia ($NH_3$) to gaseous acidic impurity for absorption column 2 has been found to be about 13:1, or less, while a molar ratio of about 2.4:1 has been found sufficient in treating one gas composition in absorption column 30. In general, a molar ratio of ammonia ($NH_3$) to acidic impurity between about 2.4:1 and 13:1 is preferred. The preferred aqueous ammonia solution is a 10% by weight solution, but other suitable concentrations of ammonia may be used. The rate of flow of wash water in each of the two columns may vary over wide ranges, but a quantity of wash water equal to about 20% in excess of the theoretical quantity of water sufficient to reabsorb the entire ammonia content of the volume of 10% ammonia solution supplied to the column has been found sufficient when introduced into the column at a temperature of about 60–90° F. At lower temperatures, even less wash water may be used in many instances. When such quantity of washwater is used, it may be combined with the spent 10% ammonia solutions in absorption columns 2 and 30 and withdrawn via lines 6 and 33, respectively.

As mentioned above, the relative rates of flow of inlet gas, dilute aqueous ammonia solution and wash water to the absorption columns 2 and 30 may vary over wide ranges. One very satisfactory solution to the problem of adjusting flow rates to the most economic level may be briefly described as follows. With reference to absorption column 2, when compressed air is supplied to the base of absorption column 2 at the rate of about 1480 lb. mol/hr. at 100° F. and 600 p.s.i.g., the air having a carbon dioxide content of 0.03 mol percent and insignificant amounts of other acidic impurities, a flow rate of about 2000 lbs. per hour of 10% ammonia solution at 100° F. and a flow rate of about 4000 lbs. per hour of wash water free of acidic impurities and maintained at a temperature of about 60° F. is capable of reducing the maximum carbon dioxide content to about 0.0003 mol percent and the maximum ammonia content to about 0.0005 mol percent. With reference to the absorption column 30, when crude hydrogen is supplied to the base of absorption column 30 at the rate of about 1020 lb. mol/hr. at 100° F. and 375 p.s.i.g., the crude hydrogen having a carbon dioxide content of 1.5 mol percent, a hydrogen sulfide content of 0.1 mol percent and insignificant quantities of other acidic impurities, a flow rate of about 6,000 lbs. per hour of 10% ammonia solution at 100° F. and a flow rate of about 7000 lbs. per hour of water free of acidic impurities and maintained at a temperature of about 60° F. is sufficient to reduce the maximum carbon dioxide content to about 0.0003 mol percent and the maximum ammonia content to about 0.0005 mol percent. In the case of absorption column 2, the treated air is withdrawn via line 5 at the rate of about 1480 lb. mol/hr. and at a temperature of about 90° F., while the spent ammonia solution is withdrawn via line 6 at a temperature of about 99° F. In the case of absorption column 30, the treated crude hydrogen is withdrawn via line 32 at the rate of about 1007 lb. mol/hr. and at a temperature of about 85° F., while the spent ammonia solution is withdrawn via line 33 at a temperature of about 129° F. It may be mentioned that the above concentrations of acidic impurities and ammonia remaining in the treated gases is a maximum in every instance. In practice, when operating under preferred conditions it is usually not possible to detect the presence of acidic impurities such as carbon dioxide in the treated gases using conventional testing procedures. It is evident that the process of the present invention is highly efficient in reducing acidic impurities to a very low level.

The absorption columns 2 and 30 and decarbonator 21 may be columns of the sieve plate type, or other suitable types of plate columns, or packed columns. The use of a column of the sieve plate type is presently preferred for absorption columns 2 and 30, and a column packed with two inch Raschig rings is presently preferred for decarbonator 21.

While the present invention has been described and illustrated herein with reference to a specific presently preferred embodiment of the present invention, it will be apparent to those skilled in the art that various modifications may be made therein without departing from the spirit or scope of the appended claims.

What is claimed is:

1. In a process for fractionating a gaseous mixture containing a normally gaseous acidic impurity including the steps of removing the acidic impurity from the gaseous mixture and separating the gaseous mixture into at least two fractions by a fractionating process which cannot tolerate the acidic impurity, the improvement in removing the acidic impurity from the gaseous mixture comprising the steps of passing the gaseous mixture into a first absorption zone, absorbing the acidic impurity by contacting the gaseous mixture with a fresh aqueous ammonia solution in the first absorption zone, the gaseous mixture being contacted with a volume of fresh ammonia solution in excess of the theoretical minimum required to absorb the acidic impurity, removing spent aqueous ammonia solution together with the absorbed acidic impurity from the first absorption zone, removing a normally gaseous acidic impurity from water containing the same and reducing the temperature of the water by stripping the water with a dry gaseous stripping agent free of the normally gaseous acidic impurity, the dry gaseous stripping agent consisting essentially of at least one fraction separated from the gaseous mixture in the fractionating process, the quantity of dry gaseous stripping agent used in stripping the water being greater than the theoretical minimum required to remove the acidic impurity content and such as to materially reduce the temperature, passing gaseous effluent substantially free of acidic impurity and containing entrained ammonia from the first absorption zone into a second absorption zone, absorbing the ammonia by contacting the gaseous effluent in the second absorption zone with the water stripped free of the acidic impurity, the gaseous effluent being contacted with an excess of water over the theoretical minimum required to absorb the ammmonia content, removing water together with absorbed ammonia from the second absorption zone, and withdrawing a gaseous effluent substantially free of the acidic impurity and ammonia from the second absorption zone.

2. In a process for fractionating atmospheric air including the steps of removing carbon dioxide and water and then fractionating the air into at least an oxygen-rich fraction and a nitrogen-rich fraction by a low temperature fractionating process which cannot tolerate the carbon dioxide, the improvement in removing the carbon dioxide from the air comprising the steps of passing the air into a first absorption zone, absorbing the carbon dioxide by contacting the air with a fresh aqueous ammonia solution in the first absorption zone, the air being contacted with a volume of fresh ammonia solution in excess of the theoretical minimum required to absorb the carbon dioxide, removing spent aqueous ammonia solution together with the absorbed carbon dioxide from the first absorption zone, removing a normally gaseous acidic impurity from water containing the same and reducing the temperature of the water by stripping the water with a dry gaseous stripping agent free of the normally gaseous acidic impurity, the dry gaseous stripping agent consisting essentially of at least one fraction separated from the air in the fractionating process, the quantity of dry gaseous stripping agent used in stripping the water being greater than the theoretical minimum required to remove the acidic impurity content and such as to materially reduce the temperature, passing gaseous effluent substantially free of acidic impurity and containing entrained ammonia from the first absorption zone into a second absorption zone, absorbing the ammonia by contacting the gaseous effluent in the second absorption zone with the water stripped free of the acidic impurity, the gaseous effluent being contacted wtih an excess of water over the theoretical minimum required to absorb the ammonia content, removing water together with absorbed ammonia from the second absorption zone, and withdrawing a gaseous effluent substantially free of carbon dioxide and ammonia from the second absorption zone.

3. In a process for fractionating a hydrogen-containing gaseous mixture having a normally gaseous acidic impurity present including the steps of removing the acidic impurity and then fractionating the gaseous mixture into at least a hydrogen-rich fraction and a hydrogen-lean fraction by a low temperature fractionating process, the improvement in removing the acidic impurity from the gaseous mixture comprising the steps of passing the gaseous mixture into a first absorption zone, absorbing the acidic impurity by contacting the gaseous mixture with a fresh aqueous ammonia solution in the first absorption zone, the gaseous mixture being contacted with a volume of fresh ammonia solution in excess of the theoretical minimum required to absorb the acidic impurity, removing spent aqueous ammonia solution together with the absorbed acidic impurity from the first absorption zone, removing a normally gaseous acidic impurity from water containing the same and reducing the temperature of the water by stripping the water with a dry gaseous stripping agent free of the normally gaseous acidic impurity, the dry gaseous stripping agent consisting essentially of at least one fraction separated from the gaseous mixture in the fractionating process, the quantity of dry gaseous stripping agent used in stripping the water being greater than the theoretical minimum required to remove the acidic impurity content and such as to materially reduce the temperature, passing gaseous effluent substantially free of acidic impurity and containing entrained ammonia from the first absorption zone into a second absorption zone, absorbing the ammonia by contacting the gaseous effluent in the second absorption zone with the water stripped free of the acidic impurity, the gaseous effluent being contacted with an excess of water over the theoretical minimum required to absorb the ammonia content, removing water together with absorbed ammonia from the second absorption zone, and withdrawing a gaseous effluent substantially free of the acidic impurity and ammonia from the second absorption zone.

4. In a process for the synthesis of ammonia comprising fractionating a hydrogen-containing gaseous mixture having a normally gaseous acidic impurity present by a process including the steps of removing the acidic impurity and then fractionating the gaseous mixture into at least a hydrogen-rich fraction and a hydrogen-lean fraction by a low temperature fractionating process, mixing nitrogen with the acidic impurity free hydrogen-rich fraction thus obtained in a molar ratio to form an ammonia synthesis gas, and synthesizing ammonia therefrom in an ammonia synthesis plant, the improvement in removing the acidic impurity from the gaseous mixture comprising the steps of passing the gaseous mixture into a first absorption zone, absorbing the acidic impurity by contacting the gaseous mixture with a fresh aqueous ammonia solution in the first absorption zone, the gaseous mixture being contacted with a volume of fresh ammonia solution in excess of the theoretical minimum required to absorb the acidic impurity, removing spent aqueous ammonia solution together with the absorbed acidic impurity from the first absorption zone, removing a normally gaseous acidic impurity from water containing the same and reducing the temperature of the water by stripping the water with a dry gaseous stripping agent free of the normally gaseous acidic impurity, the dry gaseous stripping agent consisting essentially of at least one fraction separated from the gaseous mixture in the fractionating process, the quantity of dry gaseous stripping agent used in stripping the water being greater than the theoretical minimum required to remove the acidic impurity content and such as to materially reduce the temperature, passing gaseous effluent substantially free of acidic impurity and containing entrained ammonia from the first absorption zone into a second absorption zone, absorbing the ammonia by contacting the gaseous effluent in the second absorption zone with the water stripped free of the acidic impurity, the gaseous effluent being contacted with an excess of water over the theoretical minimum required to absorb the ammonia content, removing water together with absorbed ammonia from the second absorption zone, and withdrawing a gaseous effluent substantially free of the acidic impurity and ammonia from the second absorption zone.

5. In a process for the synthesis of ammonia comprising fractionating a gaseous mixture which is atmospheric air by a process including the steps of removing carbon dioxide and water and then fractionating the air into at least an oxygen-rich fraction and a nitrogen rich fraction by a low temperature fractionating process which cannot tolerate the carbon dioxide, at least one nitrogen-rich fraction being substantially free of oxygen, preparing a crude hydrogen gaseous mixture containing hydrocarbons, carbon dioxide and water as impurities by a process including partial combustion of hydrocarbon fuel with the oxygen-rich fraction, fractionating the crude hydrogen by a process including the steps of removing the carbon dioxide and water and then fractionating the crude hydrogen into at least a hydrogen-rich fraction and a hydrocarbon-rich fraction by a low temperature fractionating process which cannot tolerate the carbon dioxide, mixing nitrogen-rich fraction from the air fractionating process with the hydrogen-rich fraction in a molar ratio to form an ammonia synthesis gas, the nitrogen-rich fraction being substantially free of oxygen, and then synthesizing ammonia therefrom in an ammonia synthesis plant, the improvement in removing the carbon dioxide from the atmospheric air and the crude hydrogen comprising the steps of, in each instance, passing the gaseous mixture into a first absorption zone, absorbing the carbon dioxide by contacting the gaseous mixture with a fresh aqueous ammonia solution in the first absorption zone, the gaseous mixture being contacted with a volume of fresh ammonia solution in excess of the theoretical minimum required to absorb the carbon dioxide, removing spent aqueous ammonia solution together with the absorbed carbon dioxide from the first absorption zone, removing carbon dioxide from water containing the same and reducing the temperature of the water by stripping the water with a dry gaseous stripping agent free of carbon dioxide, the dry gaseous stripping agent consisting of at least one fraction separated from the air and crude hydrogen in the fractionating process, the quantity of dry gaseous stripping agent used in stripping the water being greater than the theoretical minimum required to remove the carbon dioxide content and such as to materially reduce the temperature, passing gaseous effluent substantially free of carbon dioxide and containing entrained ammonia from the first absorption zone into a second absorption zone, absorbing the ammonia by contacting the gaseous effluent in the second absorption zone with the water stripped free of the carbon dioxide, the gaseous effluent being contacted with an excess of water over the theoretical minimum required to absorb the ammonia content, removing water together with absorbed ammonia from the second absorption zone, and withdrawing a gaseous effluent substantially free of carbon dioxide and ammonia from the second absorption zone.

References Cited in the file of this patent

UNITED STATES PATENTS

| | | |
|---|---|---|
| 1,935,469 | Ellis | Nov. 14, 1933 |
| 2,070,620 | Price | Feb. 16, 1937 |
| 2,773,003 | Brown et al. | Dec. 4, 1956 |

FOREIGN PATENTS

| | | |
|---|---|---|
| 11,077 of 1906 | Great Britain | Jan. 3, 1907 |